United States Patent
Idicula et al.

(10) Patent No.: US 8,417,714 B2
(45) Date of Patent: Apr. 9, 2013

(54) TECHNIQUES FOR FAST AND SCALABLE XML GENERATION AND AGGREGATION OVER BINARY XML

(75) Inventors: Sam Idicula, Santa Clara, CA (US); Sandeep Mane, Sunnyvale, CA (US); Bhushan Khaladkar, Mountain View, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 251 days.

(21) Appl. No.: 12/692,549

(22) Filed: Jan. 22, 2010

(65) Prior Publication Data

US 2011/0184969 A1    Jul. 28, 2011

(51) Int. Cl.
 G06F 7/00    (2006.01)
 G06F 17/30    (2006.01)

(52) U.S. Cl.
 USPC .......................................... 707/756; 707/760

(58) Field of Classification Search .................. 707/756, 707/760
 See application file for complete search history.

(56) References Cited

U.S. PATENT DOCUMENTS

| | | | |
|---|---|---|---|
| 6,546,406 B1 * | 4/2003 | DeRose et al. ................ | 715/234 |
| 6,684,204 B1 * | 1/2004 | Lal ........................ | 707/999.001 |
| 6,934,712 B2 * | 8/2005 | Kiernan et al. ........ | 707/999.003 |
| 6,941,510 B1 * | 9/2005 | Ozzie et al. .................... | 715/234 |
| 7,051,042 B2 * | 5/2006 | Krishnaprasad et al. ...................... | 707/E17.126 |
| 7,062,493 B1 * | 6/2006 | Babka et al. ................... | 707/756 |
| 7,207,002 B2 * | 4/2007 | Mireku ......................... | 715/234 |
| 7,213,017 B2 * | 5/2007 | Rys et al. .............. | 707/999.004 |
| 7,346,598 B2 * | 3/2008 | Arora et al. ............ | 707/999.001 |
| 7,702,637 B2 * | 4/2010 | Terek et al. ................ | 707/999.1 |
| 7,802,180 B2 * | 9/2010 | Warner et al. ................. | 715/234 |
| 7,814,408 B1 * | 10/2010 | Dunietz et al. ................ | 715/234 |
| 2005/0229158 A1 * | 10/2005 | Thusoo et al. ................ | 717/115 |
| 2006/0036935 A1 * | 2/2006 | Warner et al. ................. | 715/500 |
| 2006/0150096 A1 * | 7/2006 | Thacker et al. ............... | 715/525 |

* cited by examiner

*Primary Examiner* — James Trujillo
*Assistant Examiner* — Pavan Mamillapalli
(74) *Attorney, Agent, or Firm* — Hickman Palermo Truong Becker Bingham Wong LLP

(57) ABSTRACT

Techniques for fast and scalable generation and aggregation of XML data are described. In an example embodiment, an XML query that requests data from XML documents is received. The XML query is evaluated to determine one or more XML results. For each particular XML result, evaluating the XML query comprises: instantiating a particular data structure that represents the particular XML result, where the particular data structure is encoded in accordance with tags specified in the XML query but does not store the tags; and storing, in the particular data structure, one or more locators that respectively point to one or more fragments in the XML documents, where the particular data structure stores the one or more locators but does not store the one or more fragments. On demand, in response to a request indicating the particular XML result, a serialized representation of the particular XML result is generated based at least on the particular data structure.

28 Claims, 3 Drawing Sheets

TECHNIQUES FOR FAST AND SCALABLE XML GENERATION AND AGGREGATION OVER BINARY XML

FIELD OF THE INVENTION

The present invention relates to generating and aggregating extended markup language (XML) data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML generation and aggregation based on location paths (e.g., such as XPaths) are common operations that are performed during the evaluation of an XML query (e.g., such as an XQuery query). In many cases, the XML queries specify that the query results need to be returned in a structured XML-based format that may be different from the format in which the returned XML data is stored in the original XML documents over which the query is executed. Processing such XML queries involves generating a query result in which data from relevant XML fragments (identified typically by XPaths) of the original XML documents are embedded in the query result, but are identified by the new XML tags that are specified in the query.

For example, the following XQuery query Q1 is from the XMark benchmark testing standard:

---
Q1:

```
declare namespace xm="xmark.xsd"; for $i in
  distinct-values($auction/xm:site/people/person/profile/interest/
  @category)
let $p :=
  for $t in $auction/xm:site/people/person
  where $t/profile/interest/@category = $i
  return
    <personne>
      <statistiques>
        <sexe>{$t/profile/gender/text( )}</sexe>
        <age>{$t/profile/age/text( )}</age>
        <education>{$t/profile/education/text( )}</education>
        <revenu>{fn:data($t/profile/@income)}</revenu>
      </statistiques>
      <coordonnees>
        <nom>{$t/name/text( )}</nom>
        <rue>{$t/address/street/text( )}</rue>
        <ville>{$t/address/city/text( )}</ville>
        <pays>{$t/address/country/text( )}</pays>
        <reseau>
          <courrier>{$t/emailaddress/text( )}</courrier>
          <pagePerso>{$t/homepage/text( )}</pagePerso>
        </reseau>
      </coordonnees>
      <cartePaiement>{$t/creditcard/text( )}</cartePaiement>
    </personne>
return <categorie>{<id>{$i}</id>, $p}</categorie>'
```
---

In the underlying XML documents against which the above query Q1 is executed, a person's gender, age, education, and income are stored in XML elements that are identified by the XPaths "$t/profile/gender/text( )", "$t/profile/age/text( )", "$t/profile/education/text( )", and "$t/profile/@income", respectively. The above query Q1 returns a query result with "<categorie>" as the root element, in which XPath-based XML fragments (such as, for example, a fragment identified by the XPath "$t/profile/age/text( )") are embedded. In the returned query result, the embedded XML fragments are identified by the XML tags specified in the query and not by the names of the XML elements in the underlying XML documents over which query Q1 is executed. For example, an XML fragment that provides various data about a person would be identified in the query result of query Q1 by the tag "<statistiques>", and within this XML fragment the person's gender, age, education, and income would be identified by the tags "<sexe>", "<age>", "<education>", and "<revenu>", respectively.

Furthermore, many queries specify that XML fragments from various locations within an XML document or across several XML documents need to be aggregated into one result document. Such aggregation of XML data is typically performed in conjunction with, and during, the generation of the results of the queries. For example, the following XQuery query Q2 (also from the XMark benchmark testing standard) is an example of a query for which XML data generation and aggregation are typically performed in conjunction with each other:

---
Q2:

```
declare namespace xm="xmark.xsd";
let $ca := $auction/xm:site/closed_auctions/closed_auction return
let
  $ei := $auction/xm:site/regions/europe/item
  for $p in $auction/xm:site/people/person
    let $a :=
      for $t in $ca
      where $p/@id = $t/buyer/@person
      return
        let $n := for $t2 in $ei where $t/itemref/@item = $t2/
          @id return $t2
        return <item>{$n/name/text( )}</item>
    return <person name="{$p/name/text( )}">{$a}</person>'
```
---

In many cases, the result of an XML query that requires XML data generation and aggregation can be quite large. This is partly due to the size of the XML fragments that are embedded in the query result.

However, past approaches for XML data generation and aggregation are inefficient and do not scale well for queries that return large results. This is because the past approaches perform the generation and aggregation operations by serializing the entire query result (typically in plain text or in XML 1.0 format) and storing the serialized result into a temporary large object (LOB). Serialization of the entire query result and storing it into a temporary LOB causes a major performance problem, mainly due to the large number of input/output (I/O) disk operations that are involved and the large amount of volatile memory that is consumed. This performance problem is further exacerbated because the past approaches evaluate a query by serializing all the necessary intermediate results, which themselves may be quite large because of the size of the XML fragments embedded therein. According to the past approaches, all the necessary intermediate results are generated and serialized during the intermediate stages of processing the query even though not all of the intermediate results would be returned in the final result of the query.

BRIEF DESCRIPTION OF THE DRAWINGS

The techniques described herein are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the techniques for generation and aggregation of XML data described herein. It will be apparent, however, that the techniques described herein may be practiced without these specific details. In other instances, well-known structures and devices are shown in block diagram form in order to avoid unnecessarily obscuring the techniques described herein.

General Overview

Techniques for fast and scalable generation and aggregation of XML data are described herein. In an example embodiment, during the evaluation phase of a query, one or more XML results of the query are represented by using one or more corresponding compact in-memory data structures without materializing and serializing the XML results. Each compact in-memory data structure stores information which is used to serialize the corresponding XML result on demand. For example, each compact in-memory data structure stores one or more locators that respectively point to one or more fragments in the XML document(s) over which the query is evaluated, where the data structure stores the one or more locators but does not store the one or more fragments pointed to by the one or more locators. In response to a request indicating an XML result of the query, the corresponding compact in-memory data structure is used to generate a serialized representation of that XML result. For example, the request may indicate a particular individual XML result, in which case a serialized representation of that particular XML result is generated from the corresponding compact in-memory data structure. In another example, the request may be a request for the serialized final result of the query, in which case the serialized representations of all XML results of the query are generated and then combined into the serialized final result of the query.

In this manner, the techniques described herein provide for fast and scalable generation and aggregation of XML data during query evaluation. It has been observed that embedded fragments, which make up the bulk of the final query result of a query, can be read directly from the underlying XML documents as long as the physical storage format of the XML documents allows for fragment-level retrieval. This allows the techniques described herein to keep minimal information about each fragment (such as, for example, its location in its XML document) in the compact in-memory data structure during the evaluation phase of the query, rather than the serialized form or representation of that fragment. After the query is evaluated, the location information stored in the compact in-memory data structures is used to generate serialized representations of the corresponding fragments on demand.

Functional Description of an Example Embodiment

Figure 1:
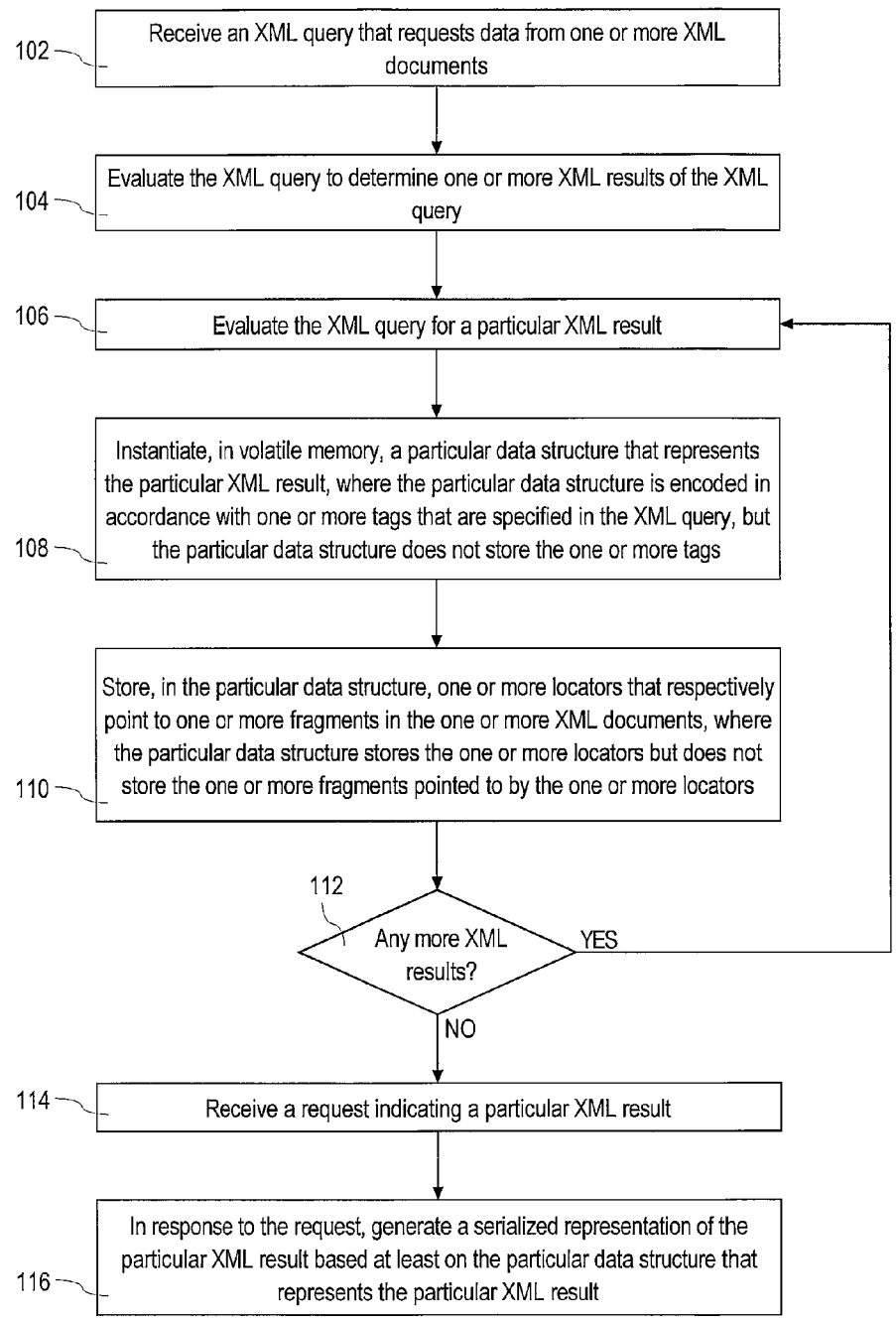
FIG. 1 is a flow diagram that illustrates an example method for generating and aggregating XML data according to one embodiment.

FIG. 1 is a flow diagram that illustrates an example method for generating and aggregating XML data in accordance with the techniques described herein.

In some embodiments, the steps of the method illustrated in FIG. 1 are performed by a database server that is executing on one or more computing devices. As used herein, "server" refers to one or more software components which, when executed, may be allocated computational resources, such as memory, CPU time, and/or disk storage space in order to perform one or more functionalities. "Database server" refers to a server that is operable to perform various functionalities against one or more databases that may include, without limitation, relational databases, object databases, object-relational databases, various kinds of XML data repositories, and any combinations thereof. For example, by utilizing its allocated resources, a database server may be operable to perform various data management functions (including, but not limited to, controlling and facilitating access to particular databases, processing requests by clients to access particular databases, and processing requests by clients to add, delete, or modify data in particular databases), as well as database management functions (including, but not limited to, creating databases and tables, allocating disk space for databases and tables, and creating and maintaining user login information, role information, and security policy information). In clustered operational environments, a database server may be a server instance that operates as part of a database server cluster that is operable to perform data management functions and database management functions against one or more databases. In other embodiments, the steps of the method illustrated in FIG. 1 are performed by computer process entities other than a database server including, but not limited to, application servers, standalone programs, query processors executing on middleware platforms, and various client and/or client-server applications that provide for processing of XML data.

The method illustrated in FIG. 1 is described hereinafter as being performed by a database server or one or more components thereof. However, it is noted that this description is for illustrative purposes only because the method of FIG. 1 is not limited to being performed by any particular type of computer process entity or server.

In step 102, a database server and/or a component thereof receives an XML query that requests data from one or more XML documents. As used herein, "XML query" refers to a query that requests a set of XML data that is identified in the query by one or more location paths to portions of one or more XML documents. One example of such location paths are XPath location paths. One example of an XML query is a query that conforms to an XQuery specification, one version of which is described in "XQuery 1.0: An XML Query Language", W3C Recommendation 23 Jan. 2007. Another example of an XML query is a query that conforms to an XPath specification, one version of which is described in "XML Path Language (XPath) 2.0", W3C Recommendation 23 Jan. 2007. It is noted that the techniques described herein are not limited to being implemented only for XQuery queries or XPath queries that conform to a specific XQuery or XPath specification. Rather, the techniques described herein may be implemented for any types of queries that can request XML data identified by location paths and that conform to any now known or later developed query specifications or query languages.

In step 104, the database server evaluates the XML query to determine one or more XML results. According to the techniques described herein, evaluating the XML query comprises compiling and executing (or directly executing without compilation) the XML query but without materializing any serialized representations of the XML results that are included in the final query result. As used herein, "XML result" refers to a separately identifiable set of data to which an XML query evaluates in whole or in part. For example, with respect to the XQuery query Q1 which was discussed above, an XML result is the set of data that is returned for a particular person (e.g., John Doe). It is noted that the XQuery query Q1 can return data for many different persons (e.g., John Doe, Paul Smith, Jane Brown, etc.); thus, the set of data for each individual person would be an XML result of the XQuery query Q1, and the final query result of query Q1 would include the XML results for all individual persons.

As part of or after performing step 104, steps 106 to 112 are performed to evaluate the XML query for each XML result that the query needs to return. For example, a database server or a component thereof may compile the received XML query and, as part of executing the compiled query, the database server may perform steps 106 to 112. In another example, a database server or a query processor may perform steps 106 to 112 as part of step 104 without utilizing separate compilation and execution phases in processing the received XML query.

In step 106, the database server or a component thereof evaluates the received XML query to determine each particular XML result. In step 108, as part of executing the query, the database server instantiates in volatile memory a particular data structure that represents the particular XML result. The particular data structure is encoded in accordance with one or more tags that are specified in the XML query, but the particular data structure does not store the one or more tags. Instead, the particular data structure is a compact in-memory data structure having one or more fields that are suitable for storing data values associated with the particular XML result. Examples of such compact in-memory data structures include, but are not limited to, arrays, tables, lists, and any other suitable memory structures that provide one or more fields.

In step 110, as part of executing the query, the database server or a component thereof stores into the particular data structure one or more locators that represents the particular XML result, where the one or more locators respectively point to one or more fragments in the one or more underlying XML documents over which the received XML query is executed. As used herein, "locator" refers to a data value or a set of data values that identify the location of a fragment within an XML document stored on one or more persistent storage devices (e.g., such as optical or hard disks); for example, a locator may include the tuple of values "{document ID, offset, flag}", where the document ID value identifies an XML document in which a fragment resides, the offset value identifies the location of the fragment within the identified XML document, and the flag value indicates one or more properties of the locator and/or of the fragment. "Fragment" refers to a single sub-tree portion that is included in an XML document between a single opening tag and a corresponding closing tag. According to the techniques described herein, the particular data structure stores the one or more locators that point to one or more fragments that store data that is part of the particular corresponding XML result, but the particular data structure does not store the one or more fragments themselves or any data therefrom. In addition, for data values in the particular XML result that are not fragments, in step 110 the database server or the component thereof may extract one or more content values that are of atomic data types (e.g., Boolean, Text, Number, and Datetime datatypes, etc.) from the underlying XML document(s); then the database server or the component thereof may store the one more extracted content values in the particular data structure that represents the particular XML result. In this manner, at the end of the execution phase of the received XML query, the particular data structure that represents the particular XML result: (1) stores, for the portions of the particular XML result that are fragments, locators that point to the fragments in the underlying XML document(s); and (2) for the portions of the particular XML result that are content values, may also store the content values themselves.

In step 112, the database server or a component thereof determines whether any more XML results for the received XML query need to be evaluated. If there are more XML results to be evaluated, the database server or the component thereof proceeds to perform steps 106, 108, 110, and 112 for each XML result that remains to be processed. In this manner, at the end of the execution phase of the received XML query, each XML result that is part of the final query result is represented in volatile memory by a separate compact data structure that: stores locators that point to fragments in the underlying XML document(s) for the portions of the XML result that are fragments; and may also stores the actual content values themselves for the portions of the XML result that are content values. Each separate compact data structure is encoded in accordance with the tag(s) that are specified in the received XML query but does not store the actual tags. In this manner, the compact in-memory data structures that represent the individual XML results to be returned by the XML query consume as little volatile memory as possible, while at the same time store enough information from which a serialized representation of each individual XML result can be generated on demand.

For example, consider the XQuery query Q1 that was discussed above. When query Q1 is executed in accordance with the techniques described herein, after the execution phase is completed the database server would store in volatile memory a separate data structure that stores data associated with each separate person (e.g., John Doe, Paul Smith, Jane Brown, etc.) for which query Q1 needs to return results. Each separate data structure would be encoded in the same way to represent the same tags (e.g., "<personne>", "<statistiques>", "<coordonnees>", "<cartePaiement>", etc.) that are specified in the received XML query to define the structure of the query result; however, each separate data structure would store different locators and may store different content values that are specific to, and associated with, a different person.

Referring back to FIG. 1, in steps 114 and 116 the database server or a component thereof generates on demand a serialized representation of a particular XML result based on the compact data structure that represents that particular XML result in volatile memory. As used herein, "serialized representation" of a set of data refers to a well-formatted XML representation (e.g., in XML 1.0 format) of the set of data or to a plain text representation of the set of data.

Specifically, in step 114 the database server or the component thereof receives a request that indicates a particular XML result of the XML query. For example, the request may be a call, invoked by another database server component, to generate the serialized final result of the entire XML query that includes the serialized representations of all XML results of the XML query, including the particular XML result. In another example, the request may be a call that identifies only a subset of all XML results that includes the particular XML result.

In response to the request received in step 114, in step 116 the database server or a component thereof generates a serialized representation of the XML result indicated in the request based on the particular data structure that represents that XML result in volatile memory. For example, in step 116 the database server generates the one or more tags in accordance with which the particular data structure is encoded and then stores the tags in, and formats accordingly, the serialized representation of the particular XML result. The database server then uses the one or more locators in the particular data structure to extract the one or more fragments, which are pointed to by the locators, as entire units from the persistent storage device(s) that store the XML document(s) in which the fragments are stored. The database server then embeds the one or more fragments into the serialized representation of the particular XML result. Further, if in addition to the locators the particular data structure also stores content value(s) of the particular XML result, the database server retrieves the content value(s) from the particular data structure and stores the content value(s) in the serialized representation of the particular XML result.

In this manner, the techniques described herein provide for fast and scalable generation and aggregation of XML data. During the evaluation phase of an XML query, the techniques described herein provide for keeping minimal information (e.g., locators) in compact in-memory data structures for the fragments that store the data for the XML results of the XML query, rather than generating and keeping the serialized form or representation of these fragments as was done in past approaches. According to the techniques described herein, after the query is evaluated, the locators stored in the compact in-memory data structures are used to generate serialized representations of the corresponding XML results on demand.

Structural Description of an Example Embodiment

Figure 2:
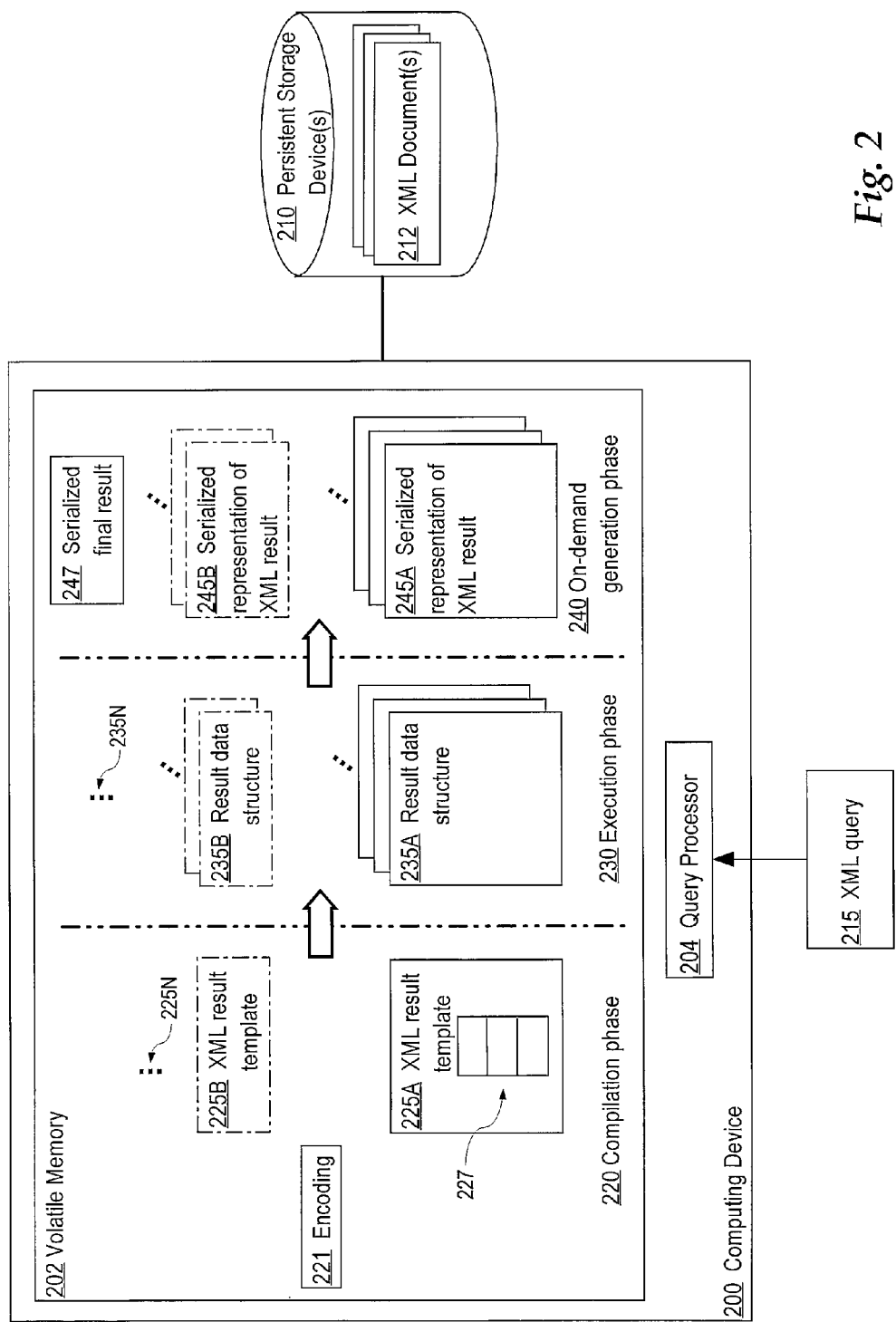
FIG. 2 a block diagram that illustrates an example operational context according to one embodiment.

FIG. 2 a block diagram that illustrates an example system in which embodiments of the techniques described herein may be implemented. Computing device 200 is communicatively or operatively connected to persistent storage device(s) 210.

Persistent storage device(s) 210 are configured to store XML document(s) 212. For example, persistent storage device(s) 210 may comprise storage media that stores XML document(s) 212 in a suitable data repository including, but not limited to, a relational database, an object-relational database, an XML database, and a set of one or more files in one or more file systems.

Computing device 200 comprises volatile memory 202 and is operable to execute query processor 204. Volatile memory 202 may be a dynamic memory or a portable memory such as, for example, random access memory (RAM) or a thumb drive.

Query processor 204 is logic operable to process XML queries in accordance with the techniques described herein. As used herein, "logic" refers to a set of instructions which, when executed by one or more processors, are operable to perform one or more functionalities. In various embodiments and implementations, any such logic may be implemented as one or more software components that are executable by one or more processors, as one or more hardware components such as Application-Specific Integrated Circuits (ASICs) or other programmable Integrated Circuits (ICs), or as any combination of software and hardware components. For example, query processor 204 may be implemented, without limitation, as one or more software modules, as one or more libraries of functions, as one or more dynamically linked libraries, and as a standalone or a client-server software application.

According to the techniques described herein, query processor 204 is operable at least to receive XML queries and to evaluate the received XML queries and produce XML results for the XML queries on demand in accordance with the techniques described herein. To perform these functionalities, in some embodiments query processor 204 may include a parser module, a compiler module, and/or an execution module, where these query processor modules may be implemented as one integrated component or as one or more components that are separate from the query processor. In some embodiments, query processor 204 may be implemented as part of a database server, such as, for example, a relational database server, an object-relational database server, or an XML database server. In other embodiments, query processor 204 may be implemented as part of a middle-tier engine or an application server that is operable to send XML queries to one or more database servers for execution. It is noted that these example implementations of a query processor are provided herein for illustrative purposes and are therefore to be regarded in an illustrative rather than a restrictive sense.

In a practical operational example, query processor 204 receives XML query 215 and processes the XML query in accordance with the techniques described herein. Specifically, query processor 204 evaluates XML query 215 during an evaluation phase (which includes compilation phase 220 and execution phase 230), and in on-demand generation phase 240 generates serialized representations of one or more XML results of the query or a serialized representation of the final result of the query.

During compilation phase 220, query processor 204 compiles XML query 215 and generates various compilation information (e.g., abstract syntax tree, operator tree, query execution plan, etc.) that is needed to execute the query. As part of compiling XML query 215, or thereafter, query processor 204 generates encoding 221 and one or more template structures (which are indicated in FIG. 2 as ellipsis 225N). Each template structure and the fields therein are configured to correspond to a unique set of tags for an XML result of XML query 215, where the unique set of tags is specified in the XML query and defines the format and structure of a serialized representation of that XML result. Thus, if XML query 215 specifies that all XML results returned from the query will have the same set of tags, then query processor 204 generates only one template structure that corresponds to that set of tags. If XML query 215 specifies two or more different sets of tags for the XML results that are to be returned from the query, query processor 204 generates two or more template structures that respectively correspond to the two or more sets of tags for the XML results. For example, as illustrated in FIG. 2, query processor 204 generates XML result template structure 225A, which corresponds to one unique set of tags specified in XML query 215, and XML result template structure 225B which corresponds to a different set of tags specified in XML query 215.

Each template structure generated by query processor 204 comprises one or more empty fields that are suitable for storing locators and/or content values associated with an XML result. For example, template structure 225A comprises fields 227 that are configured for storing locators and/or content values associated with an XML result that would include the corresponding set of tags specified in XML query 215. Similarly, template structure 225B comprises fields (not shown in FIG. 2) that are configured for storing locators and/or content values associated with a different XML result that would include a different corresponding set of tags specified in XML query 215.

Along with the template structures, query processor 204 also generates encoding 221 that maps the fields in the template structures to their corresponding tags that are specified in XML query 215. As used herein, "encoding" refers to a set of metadata information that stores the order and the properties (e.g., tag names, namespace identifiers, etc.) of the tags specified in an XML query and that associates the tags with corresponding fields in a data structure that represents an XML result. Thus, encoding 221 stores metadata information that maps the fields in each different template structure, generated by query processor 204 for XML query 215, to the different set of tags that corresponds to that template structure.

After compiling XML query 215, query processor 204 executes XML query 215 during execution phase 230 based on the compilation information (e.g., operator tree, query execution plan, etc.) that was generated during compilation phase 220.

According to the techniques described herein, when executing XML query 215, query processor 204 initializes a compact in-memory data structure (as indicated by ellipsis 235N) for each XML result that is to be returned in response to XML query 215. Specifically, for each particular XML result, query processor 204 determines the template structure that corresponds to that particular XML result, makes a copy (or instance) of that template structure, and stores in that copy of the template structure a set of information (e.g., such as result ID) that identifies that particular XML result; thus, this initialized copy of the template structure becomes the compact data structure that represents the particular XML result. Then, for each particular compact data structure, query processor 204: determines one or more locators that point to one or more fragments, in XML document(s) 212, that store data that is part of the particular XML result corresponding to that particular compact data structure; and stores the one or more locators in fields of that particular compact data structure but without extracting or storing in the particular compact data structure the one or more fragments themselves or any data therefrom. In addition, for data (if there is any) in the particular XML result that is not fragments, query processor 204 may extract one or more content values that are of atomic data types from XML document(s) 212 and may store the one or more content values in fields of the particular compact data structure that corresponds to the particular XML result.

For example, query processor 204 determines that XML query 215 needs to return one or more XML results that correspond to template structure 225A. Then, for each particular XML result in the one or more XML results, query processor 204 initializes a separate instance of template structure 225A and stores in that instance a set of information (e.g., such as result ID) that uniquely identifies that particular XML result; thus, this initialized instance becomes compact data structure 235A. Then, for each separate compact data structure 235A, query processor 204: determines one or more locators that point to one or more fragments, in XML document(s) 212, that store data that is part of the XML result corresponding to that compact data structure 235A; and stores the one or more locators in fields of that compact data structure 235A but without extracting or storing therein the one or more fragments themselves or any data therefrom. In addition, for data (if there is any) in the particular XML result that is not fragments, query processor 204 may extract one or more content values that are of atomic data types from XML document(s) 212 and may store the one or more content values in fields of the compact data structure 235A that corresponds to that particular XML result. In a similar manner, query processor 204 determines XML results correspond to different template structure(s) (e.g., such as template structure 225B) and generates and populates compact data structures for these XML results (e.g., such as compact data structures 235B that correspond to template structure 225B).

In this manner, at the end of execution phase 230, each compact data structure that represents a particular XML result: (1) stores, for the portions of the particular XML result that are fragments, locators that point to the fragments in XML document(s) 212; and (2) may also store, for the portions of the particular XML result that are content values, the content values themselves. Thus, the compact data structures that represent the individual XML results to be returned by XML query 215 consume as little volatile memory as possible, while at the same time store enough information from which a serialized representation of each individual XML result can be generated on demand. It is also noted that evaluating XML query 215 in this manner avoids serialization of the fragments included in the individual XML results of XML query 215 until the individual XML results are actually needed.

During on-demand generation phase 240, query processor 204 can generate on demand the serialized representations of the XML results of XML query 215 based on the information stored in the compact data structures generated during execution phase 230. For example, query processor 204 may receive a request for the serialized representation of a particular XML result from a caller entity that requires that XML result, where the caller entity may be a client that sent XML query 215 or some application programming interface (API) component that mediates calls to query processor 204. In another example, query processor 204 may receive a request for the serialized final result of XML query 215 from a caller entity, where the serialized final result is a serialized representation of the XML data returned by XML query 215 and includes the serialized representations of the individual XML results generated for the query.

For example, in response to a request for a particular XML result that is structured according template structure 225A, query processor 204 generates a serialized representation 245A of the XML result based on the compact data structure 235A that represents that particular XML result in volatile memory. Specifically, query processor 204 examines encoding 221 and generates the one or more tags in accordance with which compact data structure 235A is encoded. Query processor 204 then stores the one or more tags in, and formats accordingly, serialized representation 245A of the particular XML result. Query processor 204 uses the one or more locators that are stored in compact data structure 235A to extract the one or more fragments, which are pointed to by the locators, as entire units from XML document(s) 212 in which the fragments are stored. Query processor 204 then embeds the one or more fragments into serialized representation 245A of the particular XML result. Further, if in addition to the locators compact data structure 235A also stores content value(s) of the particular XML result, query processor 204 retrieves the content value(s) from compact data structure 235A and stores the content value(s) in serialized representation 245A of the particular XML result. In this manner, query processor 204 can generate the serialized representation of an individual XML result of XML query 215 on demand.

In response to a request to generate the entire serialized final result of XML query 215, query processor 204 may first generate the serialized representation of each individual XML result that is to be returned from XML query 215 (e.g., such as serialized representations 245A and 245B). Then, query processor 204 can combine the serialized representations of the individual XML results into the serialized final result 247 of XML query 215, and can further format serialized final result 247 if necessary.

In this manner, query processor 204 provides for fast and scalable generation and aggregation of the XML data that is to be returned from XML query 215. During the evaluation phase of XML query 215, query processor 204 keeps minimal information (e.g., such as locators) in the compact in-memory data structures, rather than generating and storing the serialized representation of the fragments in the individual XML results as was done in past approaches. Then, the during the on-demand generation phase, query processor 204 uses the information stored in the compact in-memory data structures to generate the serialized representation of any individual XML result and/or the entire serialized final result of XML query 215.

Storage Formats for XML Documents

In some embodiments, the techniques for generation and aggregation of XML data described herein are implemented for XML documents that are physically stored in accordance with storage formats that allow for fragment-level retrieval. This allows the techniques described herein to efficiently use locators to extract XML fragments from a repository that stores XML documents encoded in such storage formats.

One example of such storage format is a binary-encoded format that uses Qualified Name identifiers (QName IDs) to identify XML element properties (e.g., such as tag names, attribute names, etc.). For example, when an XML document is physically stored is a storage medium, QName IDs are used in the storage to identify XML element tag names and attribute names instead of using the actual tag names and attribute names specified in the XML document. To facilitate this storage format, a system implementing the storage format may store in a repository some mapping or encoding that associates the QName IDs with the corresponding properties (e.g., tag names, attribute names, etc.) of the XML elements in the XML documents that are stored by the system.

It is noted that, while not all storage formats allow for fragment-level retrieval as does the QName-based binary-encoded format described herein, there are at least some existing storage formats that can modified to provide for fragment-level retrieval.

For example, one such modification would be to make a storage format insensitive to namespace context. Typically, the different portions of an XML document are context-sensitive—that is, there may be namespaces defined in previous portions in the XML document that refer to other XML documents or to XML schemas. So, having just the text representation of an XML document may not be sufficient to allow a system to use an offset into the XML document to extract a fragment because the fragment may have prefix definitions based on namespaces that are defined in previous fragments or portions of the XML document. Thus, one modification that can make a storage format context-insensitive is to use context-insensitive identifiers (e.g., such as QName IDs) instead of XML element prefixes. For example, suppose an XML document defines the following XML element that includes the prefix "ns1":

---

<personne xmlns:ns1="....", xmlns:ns2="...">
...
  <interests>
    <in1 ns1:name="movies"> ... </in1>
  </interests>
...
</personne>

---

If this XML document is stored in a context-sensitive storage format, a system will not be able to extract only the "<interests>" fragment because the system would not know what the "<in1>" element is since it includes the prefix "ns1" that is not defined in the fragment. However, if a unique identifier is used to replace the prefix "ns1" when the XML document is stored, the system can look up the identifier in a separate mapping or encoding and thus would be able to uniquely identify "<in1>" element when the system needs to extract only the "<interests>" fragment.

In this manner, the techniques for generation and aggregation of XML data described herein can be implemented for XML documents that are physically stored in accordance with any storage format that uses identifiers that can uniquely identify XML element attributes without the need for namespace context.

Compacting XML Tag Names

In some embodiments, instead of using the tag names specified in a received XML query, the techniques described herein use token identifiers (IDs) to indicate and identify the fields in each compact in-memory structure (and in a template structure, if such is used) that represents an XML result of the XML query. For example, during the compilation phase of the XML query, a query processor generates an encoding that maps the fields in the template structures to their corresponding tags that are specified in the received XML query, where the set of information included in the encoding associates the fields with token IDs. Each token ID may be a short data value (e.g., as short as 1 byte) that identifies an XML tag that is going to be output in a serialized representation of an XML result. The associations or mappings of token IDs to query-specified tags may be maintained locally by a query processor or may be stored and maintained in a system-wide token repository, and two hash tables (or other type of indexes) may used—one for tag name to token ID lookups and another for token IDs to tag name lookups. For a given template structure (and, correspondingly, for all compact in-memory data structures that are instantiated from that template structure), the encoding may be configured such that the order of the fields in the given template structure matches the order of the token IDs that are stored in a list that is associated in the encoding with that given template structure. Alternatively, if named fields are used in the template structures (and in the compact in-memory data structures instantiated therefrom), for each template structure the encoding may include a mapping that maps token IDs to field names.

In this manner, the techniques described herein provide for using less volatile memory when evaluating an XML query. In fact, using token IDs instead of actual tag names to encode the compact in-memory data structures that represent XML results provides an unexpectedly large saving of memory when compared to past approaches. This is because even though an XML query may specify a relatively small number of tags, it turns out that the tag names contribute significantly to the size of the serialized representations of the XML results of the XML query—e.g., especially so when the XML query returns a large number of XML results.

It is noted that the use of token IDs in accordance with the techniques described herein is different from previous tokenization approaches in at least two ways. First, according to the techniques described herein, tokens and token IDs are used to encode in-memory data structures rather than to encode serialized XML representations (typically XML documents) as used in past approaches. Second, the techniques described herein can use the smallest token IDs possible even when these small token IDs conflict with some other token IDs that may have been already used somewhere else in the system or in any specific XML document. In other words, the techniques described herein do not require system-wide uniqueness of token IDs; they also don't require uniqueness of token IDs with respect to the encoding of any input XML document involved in processing the query. By compacting tags specified in an XML query into small (e.g., single-byte) token IDs, the techniques described herein allow the sizes of the in-memory representations of the XML results of the query to be significantly reduced, which in turn leads to more efficient evaluation of the query and to faster data retrieval and query response times.

In some embodiments, the scope of the token IDs that are used to encode the in-memory data structures representing XML results is system-wide. For example, in these embodiments a token repository is kept by a system that implements the techniques described herein, and each unique tag received in a query (and/or defined in stored XML documents) is assigned a unique token ID. For example, in some embodiments QName IDs as described heretofore may be used as token IDs to uniquely identify tag names across the entire system.

In some embodiments, the scope of the token IDs used to encode the in-memory data structures may be limited to each specific XML query. In these embodiments, the token IDs do not have to be unique across a system implementing the techniques described herein and can be of different type or size than any identifiers (e.g., such as QName IDs) that used by a storage format for storing XML documents on persistent storage media. For example, in these embodiments the token IDs may be specific to a particular XML query—that is, the token IDs may be unique only within the scope of the entire final result of the XML query. In another example, in these embodiments the token IDs may be unique only within each distinct XML result returned by the XML query—e.g., if the XML query returns two differently-structured XML results such as "<author>" and "<book>", two separate sets of token IDs may be used to encode the in-memory representations of the two XML results, but the token IDs in one set may overlap with the token IDs the other set. One benefit of using query-level or individual-result-level token IDs to encode in-memory data structures is that shorter data values may be used as tokens (e.g., 1-byte IDs rather than 4-byte IDs that may be needed for system-wide tokens). It is noted that single-byte token IDs would be sufficient to encode in-memory result structures for XML queries that specify up to 256 unique tags.

Compressing Locators

In some embodiments, in order to achieve even more volatile memory savings, the techniques described herein may provide for compression of the locators stored in compact in-memory data structures that represent the XML results of an XML query.

For example, an XML query may specify an aggregation operation that requires aggregation of multiple XML fragments into a single XML result. In this case, the locators pointing to the multiple fragments may be represented much more compactly by using a form of run-length compression to compress the multiple locators into a single list or array of locators. As an example, consider a particular XML result that needs to include a sequence of multiple fragments from the same XML document. Instead of separately storing each locator (and the values included therein, such as document ID and offset) that points to a fragment in the sequence, a run-length compression mechanism may be used to store the document ID at the beginning of a list, strip the document ID from the multiple locators, store the stripped locators in the list, and then store the list within a field in the compact in-memory data structure that represents the particular XML result. In this way, the document ID is stored only once but the encoded list still stores enough information for generating the serialized representation of the particular XML result.

It is noted that compressing locators in this manner has negligible processing overhead since it basically involves only a comparison with a previous locator in the encoded, compressed list. Further, the techniques described herein use compression that is aware of the format of the locator, which allows for more efficient compression. For example the document ID component is much more likely to repeat across many locators and has fewer distinct values than other components (e.g., such as offset) of the locator—thus, compressing locators by elimination repeating document ID values allows for achieving better compression ratios.

Abstract LOBs

In some embodiments, techniques described herein provide for accessing the serialized final result of an XML query as if it were a large object (LOB) that was persistently stored, even though the XML results which comprise the final result of the XML query are not materilized as serialized representations until requested on demand.

For example, in these embodiments an abstract LOB is constructed on top of compact in-memory data structures, which represent the XML results of an XML query in accordance with the techniques described herein. The abstract LOB comprises a LOB identifier that is associated with the compact data structures that represent the XML results in volatile memory. Notably, however, the abstract LOB is not associated with an actual LOB that is persistently and durably stored; rather, the XML results and the serialized representations thereof that are referenced by, and associated with, the abstract LOB are generated on demand when a request for the abstract LOB is received. Thus, in contrast to prior usages of abstract LOBs, the techniques described herein provide for a new type of abstract LOB. This new type of abstract LOB is operable to re-direct a LOB-read operation to in-memory data structures that represent the XML results of an XML query, and to produce serialized representation of the XML results from the in-memory data structures.

As an operational example, a system implementing the techniques described herein may include an API that is operable to provide access to abstract LOBs in the same way the API provides access to regular LOBs. When the API detects a request or a call that specifies the identifier of an abstract LOB (e.g., when the API detects a read of the abstract LOB), the API generates the number of bytes requested from that abstract LOB on demand. For example, the received call may specify the identifier of the abstract LOB and a number of bytes (e.g., some or all of the bytes) from the abstract LOB. In response to the call, the API generates and returns the requested data based on the compact in-memory data structures, which are associated with the abstract LOB and which include locators (and possibly content values) for the XML data referenced by the abstract LOB. The data returned by the API may be one or more serialized representations of the XML results of an XML query (e.g., when the API call was made by a client that requests serialized XML data), where the API or a component thereof may generate the serialized representations of the requested XML results as described herein (e.g., by using the locators stored in compact in-memory data structures to retrieve fragments from the underlying XML documents and then embedding the retrieved fragments into the corresponding serialized representations). Alternatively, or in addition to, the data returned by the API may be some or all of the data stored in the compact in-memory data structures in a non-serialized format—e.g., when the API call to read the abstract LOB was made by some system component that requests data from the compact in-memory data structures (e.g., such as locators to fragments) but does need XML data in a serialized representation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device that incorporates hard-wired and/or program logic to implement the techniques.

Figure 3:
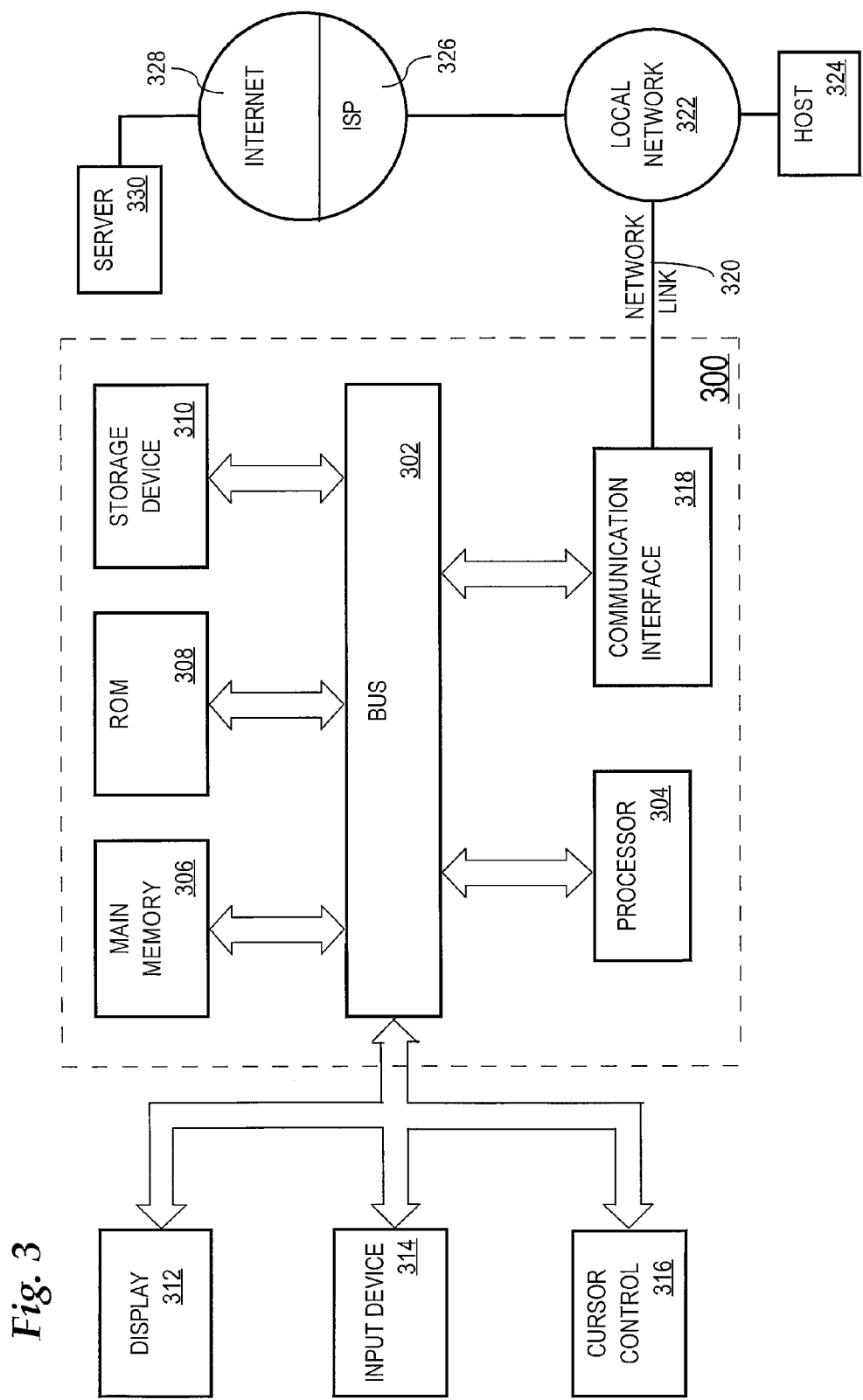
FIG. 3 is a block diagram that illustrates an example computing device on which embodiments may be implemented.

For example, FIG. 3 is a block diagram that illustrates a computer system 300 upon which an embodiment of the techniques described herein may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT) or a liquid crystal display (LCD), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
  receiving an extended markup language (XML) query that requests data from one or more XML documents, wherein the XML query specifies one or more tags;
  evaluating the XML query to determine one or more XML results for the XML query, wherein evaluating the XML query to determine one or more XML results for the XML query comprises generating and storing in volatile memory, an encoding that maps the one or more tags that are specified in the XML query to one or more fields;
  wherein evaluating the XML query for a particular XML result, of the one or more XML results, further comprises:
    instantiating, in volatile memory, a particular data structure that represents the particular XML result and that comprises the one or more fields according to the encoding; and
    storing, in the one or more fields of the particular data structure, one or more locators that respectively point to one or more fragments in the one or more XML documents, wherein the particular data structure stores the one or more locators but does not store the one or more fragments pointed to by the one or more locators, wherein a locator of said one or more locators, stored in a field of the one or more fields, includes (a) a document identifier identifying in which XML document a respective fragment resides, and (b) a value that identifies a location of the respective fragment within the identified XML document;
  in response to a request indicating the particular XML result, generating a serialized representation of the particular XML result based at least on the particular data structure;
  wherein the method is performed by one or more computing devices.

2. The method of claim 1, wherein generating the serialized representation of the particular XML result comprises:
  storing the one or more tags into the serialized representation of the particular XML result;
  using the one or more locators to extract the one or more fragments as entire units from one or more persistent storage devices that store the one or more XML documents; and
  embedding the one or more fragments into the serialized representation of the particular XML result.

3. The method of claim 1, wherein:
  for the particular XML result, evaluating the XML query further comprises extracting one or more content values from the one or more XML documents and storing the one or more content values in the particular data structure; and
  generating the serialized representation of the particular XML result further comprises retrieving the one or more content values from the particular data structure and storing the one or more content values in the serialized representation of the particular XML result.

4. The method of claim 1, wherein evaluating the XML query further comprises:
  executing the XML query wherein, for the particular XML result, executing the XML query comprises storing the one or more locators in the particular data structure.

5. The method of claim 1, wherein evaluating the XML query further comprises evaluating the XML query without generating any serialized representations of the one or more XML results of the XML query.

6. The method of claim 1,
  wherein instantiating the particular data structure in volatile memory comprises generating the particular data structure by making a copy of a template structure.

7. The method of claim 6, wherein generating the encoding comprises:
  determining one or more token identifiers that respectively identify the one or more tags that are specified in the XML query; and
  mapping, in the encoding, the one or more token identifiers to the one or more fields in the particular data structure.

8. The method of claim 7, wherein the one or more token identifiers uniquely identify the one or more tags only within the scope of the one or more XML results of the XML query.

9. The method of claim 1, wherein:
  the one or more XML results include at least two different XML results that are structured differently from each other, wherein the XML query respectively specifies at least two different sets of tags for said at least two different XML results; and
  evaluating the XML query further comprises:
    instantiating, in volatile memory, at least two different data structures that respectively represent said at least two different XML results, wherein said at least two different data structures are respectively encoded in accordance with said at least two different sets of tags; and storing, in said at least two different data structures, one or more content values or locators that are respectively associated with said at least two different XML results.

10. The method of claim 1, further comprising:

generating and storing a Large Object (LOB) identifier to represent a serialized final result of the XML query without materializing the serialized final result of the XML query, wherein the LOB identifier is associated with those one or more data structures that respectively represent the one or more XML results in volatile memory;

at a programming interface that is operable to access LOB s, receiving the request indicating the particular XML result, wherein the request includes the LOB identifier; and based on the LOB identifier, the programming interface locating the particular data structure in volatile memory and generating the serialized representation of the particular XML result based at least on the particular data structure.

11. The method of claim 1, wherein:

the XML query specifies an operation that requires aggregation of the one or more XML results; and evaluating the XML query further comprises:

compressing multiple locators, from the one or more locators, into a single locator list and storing the single locator list in the particular data structure, wherein the multiple locators respectively point to multiple fragments in a same particular XML document of the one or more XML documents.

12. The method of claim 1, wherein the one or more XML documents are stored on one or more persistent storage devices in accordance with a storage representation that utilizes element identifiers that depend on namespace context.

13. The method of claim 1, wherein the XML query is an XQuery query.

14. The method of claim 1, wherein the method is performed by a database server that is executing on the one or more computing devices.

15. One or more non-transitory storage media storing one or more sequences of instructions which, when executed by one or more processors, cause performance of steps comprising:

receiving an extended markup language (XML) query that requests data from one or more XML documents, wherein the XML query specifies one or more tags;

evaluating the XML query to determine one or more XML results of the XML query, wherein evaluating the XML query to determine one or more XML results for the XML query comprises generating and storing in volatile memory, an encoding that maps the one or more tags that are specified in the XML query to one or more fields;

wherein evaluating the XML query for a particular XML result, of the one or more XML results, further comprises:

instantiating, in volatile memory, a particular data structure that represents the particular XML result and that comprises the one or more fields according to the encoding; and storing, in the one or more fields of the particular data structure, one or more locators that respectively point to one or more fragments in the one or more XML documents, wherein the particular data structure stores the one or more locators but does not store the one or more fragments pointed to by the one or more locators, wherein a locator of said one or more locators, stored in a field of the one or more fields, includes (a) a document identifier identifying in which XML document a respective fragment resides, and (b) a value that identifies a location of the respective fragment within the identified XML document;

in response to a request indicating the particular XML result, generating a serialized representation of the particular XML result based at least on the particular data structure.

16. The one or more storage media of claim 15, wherein the instructions that cause generating the serialized representation of the particular XML result comprise instructions which, when executed by the one or more processors, cause performance of steps comprising:

storing the one or more tags into the serialized representation of the particular XML result;

using the one or more locators to extract the one or more fragments as entire units from one or more persistent storage devices that store the one or more XML documents; and embedding the one or more fragments into the serialized representation of the particular XML result.

17. The one or more storage media of claim 15, wherein:

for the particular XML result, the instructions that cause evaluating the XML query further comprise instructions which, when executed by the one or more processors, cause performance of steps comprising: extracting one or more content values from the one or more XML documents and storing the one or more content values in the particular data structure; and the instructions that cause generating the serialized representation of the particular XML result further comprise instructions which, when executed by the one or more processors, cause performance of steps comprising: retrieving the one or more content values from the particular data structure and storing the one or more content values in the serialized representation of the particular XML result.

18. The one or more storage media of claim 15, wherein the instructions that cause evaluating the XML query further comprise instructions which, when executed by the one or more processors, cause performance of steps comprising:

executing the XML query wherein, for the particular XML result, executing the XML query comprises storing the one or more locators in the particular data structure.

19. The one or more storage media of claim 15, wherein the instructions that cause evaluating the XML query further comprise instructions which, when executed by the one or more processors, cause the performance of steps comprising: evaluating the XML query without generating any serialized representations of the one or more XML results of the XML query.

20. The one or more storage media of claim 15, wherein the instructions that cause instantiating the particular data structure in volatile memory comprise instructions which, when executed by the one or more processors, cause performance of steps comprising: generating the particular data structure by making a copy of a template structure.

21. The one or more storage media of claim 20, wherein the instructions that cause generating the encoding comprise instructions which, when executed by the one or more processors, cause performance of steps comprising:

determining one or more token identifiers that respectively identify the one or more tags that are specified in the XML query; and mapping, in the encoding, the one or more token identifiers to the one or more fields in the particular data structure.

22. The one or more storage media of claim 21, wherein the one or more token identifiers uniquely identify the one or more tags only within the scope of the one or more XML results of the XML query.

23. The one or more storage media of claim 15, wherein:
the one or more XML results include at least two different XML results that are structured differently from each other, wherein the XML query respectively specifies at least two different sets of tags for said at least two different XML results; and the instructions that cause evaluating the XML query further comprise instructions which, when executed by the one or more processors, cause performance of steps comprising:

instantiating, in volatile memory, at least two different data structures that respectively represent said at least two different XML results, wherein said at least two different data structures are respectively encoded in accordance with said at least two different sets of tags; and storing, in said at least two different data structures, one or more content values or locators that are respectively associated with said at least two different XML results.

24. The one or more storage media of claim 15, wherein the one or more sequences of instructions further comprise instructions which, when executed by the one or more processors, cause performance of steps comprising:

generating and storing a Large Object (LOB) identifier to represent a serialized final result of the XML query without materializing the serialized final result of the XML query, wherein the LOB identifier is associated with those one or more data structures that respectively represent the one or more XML results in volatile memory;

at a programming interface that is operable to access LOB s, receiving the request indicating the particular XML result, wherein the request includes the LOB identifier; and based on the LOB identifier, the programming interface locating the particular data structure in volatile memory and generating the serialized representation of the particular XML result based at least on the particular data structure.

25. The one or more storage media of claim 15, wherein:
the XML query specifies an operation that requires aggregation of the one or more XML results; and the instructions that cause evaluating the XML query further comprise instructions which, when executed by the one or more processors, cause performance of steps comprising:

compressing multiple locators, from the one or more locators, into a single locator list and storing the single locator list in the particular data structure, wherein the multiple locators respectively point to multiple fragments in a same particular XML document of the one or more XML documents.

26. The one or more storage media of claim 15, wherein the one or more XML documents are stored on one or more persistent storage devices in accordance with a storage representation that utilizes element identifiers that depend on namespace context.

27. The one or more storage media of claim 15, wherein the XML query is an XQuery query.

28. The one or more storage media of claim 15, wherein the one or more sequences of instructions are included in the executable instructions of a database server.

* * * * *

UNITED STATES PATENT AND TRADEMARK OFFICE
CERTIFICATE OF CORRECTION

PATENT NO. : 8,417,714 B2  
APPLICATION NO. : 12/692549  
DATED : April 9, 2013  
INVENTOR(S) : Idicula et al.

Page 1 of 1

It is certified that error appears in the above-identified patent and that said Letters Patent is hereby corrected as shown below:

In the Specification:

In column 14, line 25, delete "materilized" and insert -- materialized --, therefor.

In the Claims:

In column 19, line 16-17, in Claim 10, delete "LOB s" and insert -- LOBs --, therefor.

In column 22, line 4-5, in Claim 24, delete "LOB s" and insert -- LOBs --, therefor.

Signed and Sealed this  
Thirtieth Day of July, 2013

Teresa Stanek Rea  
*Acting Director of the United States Patent and Trademark Office*